(12) United States Patent
Lashmore et al.

(10) Patent No.: US 9,061,913 B2
(45) Date of Patent: Jun. 23, 2015

(54) INJECTOR APPARATUS AND METHODS FOR PRODUCTION OF NANOSTRUCTURES

(75) Inventors: David S. Lashmore, Lebanon, NH (US);
Jared Chaffee, Pembroke, NH (US);
Mark Schauer, Dublin, NH (US)

(73) Assignee: Nanocomp Technologies, Inc., Merrimack, NH (US)

( * ) Notice: Subject to any disclaimer, the term of this patent is extended or adjusted under 35 U.S.C. 154(b) by 449 days.

(21) Appl. No.: 12/140,263

(22) Filed: Jun. 16, 2008

(65) Prior Publication Data

US 2009/0117025 A1    May 7, 2009

Related U.S. Application Data

(60) Provisional application No. 60/934,655, filed on Jun. 15, 2007.

(51) Int. Cl.
*D01F 9/12* (2006.01)
*D01F 9/127* (2006.01)
(Continued)

(52) U.S. Cl.
CPC .......... *C01B 31/0233* (2013.01); *B01J 4/002* (2013.01); *B01J 19/02* (2013.01); *B01J 19/24* (2013.01); *B01J 2219/00157* (2013.01); *B01J 2219/0209* (2013.01); *B01J 2219/0263* (2013.01);
(Continued)

(58) Field of Classification Search
USPC ........ 423/447.1–447.3, 445 B; 977/742–754, 977/842–848; 428/367
See application file for complete search history.

(56) References Cited

U.S. PATENT DOCUMENTS 2,962,386 A    11/1960    Doll et al.
3,090,876 A    5/1963    Hutson
(Continued)

FOREIGN PATENT DOCUMENTS

CN    1614772    5/2005
EP    1160861 A2    12/2001
(Continued)

OTHER PUBLICATIONS

Tapaszto, et al., Diameter and morphology dependence on experimental conditions of carbon nanotube arrays grown by spray pyrolysis, Carbon 2005; 43: 970-977.*
(Continued)

*Primary Examiner* — Daniel C McCracken
(74) *Attorney, Agent, or Firm* — Greenberg Traurig, LLP; Chinh H. Pham; Todd C. Basile

(57) ABSTRACT

An apparatus for use with a reactor for synthesis of nanostructures is provided. The apparatus includes a chamber having one end in fluid communication with the reactor and defining a pathway along which a fluid mixture for the synthesis of nanostructures can be injected into the reactor. The apparatus also has a tube in fluid communication with an opposite of the chamber to impart a venturi effect in order to generate from the fluid mixture small droplets prior to introducing the fluid mixture into the chamber. A heating zone is situated downstream from the tube to provide a temperature range sufficient to permit the formation, from components within the fluid mixture, of catalyst particles upon which nanostructures can be generated. A mechanism is further provided at a distal end of the chamber to minimize turbulent flow as the fluid mixture exits the chamber, and to impart a substantially laminar flow thereto. A method for synthesis of nanostructures is also provided.

7 Claims, 11 Drawing Sheets

(51) Int. Cl.

| | | |
|---|---|---|
| *C01B 31/02* | (2006.01) | |
| *B01J 4/00* | (2006.01) | |
| *B01J 19/02* | (2006.01) | |
| *B01J 19/24* | (2006.01) | |
| *B82Y 30/00* | (2011.01) | |
| *B82Y 40/00* | (2011.01) | |

(52) U.S. Cl.
CPC ............... *B82Y30/00* (2013.01); *B82Y 40/00* (2013.01); *C01B 2202/02* (2013.01); *C01B 2202/36* (2013.01)

(56) References Cited

U.S. PATENT DOCUMENTS

| | | | |
|---|---|---|---|
| 3,109,712 A | 11/1963 | Redfern | |
| 3,462,289 A | 8/1969 | Rohl et al. | |
| 3,706,193 A | 12/1972 | Amato | 57/58.89 |
| 3,943,689 A | 3/1976 | Kunz et al. | 57/34 |
| 4,384,944 A | 5/1983 | Silver et al. | 204/159.13 |
| 4,468,922 A | 9/1984 | McCrady et al. | 57/402 |
| 4,572,813 A | 2/1986 | Arakawa | 264/29.2 |
| 4,687,939 A | 8/1987 | Miyauchi et al. | |
| 4,987,274 A | 1/1991 | Miller et al. | 174/102 |
| 5,168,004 A | 12/1992 | Daumit et al. | 428/221 |
| 5,428,884 A | 7/1995 | Tsuzuki | 29/290 |
| 5,488,752 A | 2/1996 | Randolph | 15/250.06 |
| 5,747,161 A | 5/1998 | Iijima | |
| 6,036,774 A | 3/2000 | Lieber et al. | 117/105 |
| 6,110,590 A | 8/2000 | Zarkoob et al. | 428/364 |
| 6,143,412 A | 11/2000 | Schueller et al. | |
| 6,265,466 B1 | 7/2001 | Glatkowski et al. | 523/137 |
| 6,299,812 B1 | 10/2001 | Newman et al. | |
| 6,308,509 B1 | 10/2001 | Scardino et al. | 57/402 |
| 6,333,016 B1 | 12/2001 | Resasco et al. | 423/447.3 |
| 6,376,971 B1 | 4/2002 | Pelrine et al. | |
| 6,426,134 B1 | 7/2002 | Lavin et al. | |
| 6,452,085 B2 | 9/2002 | Tauchi et al. | |
| 6,495,116 B1 | 12/2002 | Herman | |
| 6,541,744 B2 | 4/2003 | Von Arx et al. | |
| 6,611,039 B2 | 8/2003 | Anthony et al. | |
| 6,682,677 B2 | 1/2004 | Lobovsky et al. | 264/172.11 |
| 6,706,402 B2 | 3/2004 | Rueckes et al. | |
| 6,723,299 B1 | 4/2004 | Chen et al. | |
| 6,790,426 B1* | 9/2004 | Ohsaki | 423/447.2 |
| 6,842,328 B2 | 1/2005 | Schott et al. | |
| 6,908,572 B1 | 6/2005 | Derbyshire et al. | |
| 6,923,946 B2 | 8/2005 | Geohegan et al. | |
| 6,979,709 B2 | 12/2005 | Smalley et al. | |
| 7,001,556 B1 | 2/2006 | Shambaugh | |
| 7,045,108 B2 | 5/2006 | Jiang et al. | |
| 7,048,999 B2 | 5/2006 | Smalley et al. | 428/367 |
| 7,052,668 B2 | 5/2006 | Smalley et al. | |
| 7,182,929 B1 | 2/2007 | Singhal et al. | |
| 7,323,157 B2 | 1/2008 | Kinloch et al. | |
| 7,413,474 B2 | 8/2008 | Liu et al. | |
| 7,437,938 B2 | 10/2008 | Chakraborty | |
| 7,491,883 B2 | 2/2009 | Lee et al. | |
| 7,553,472 B2 | 6/2009 | Mouli et al. | |
| 7,615,097 B2 | 11/2009 | McKechnie et al. | |
| 7,615,204 B2 | 11/2009 | Ajayan et al. | |
| 7,704,480 B2 | 4/2010 | Jiang et al. | |
| 7,727,504 B2 | 6/2010 | Kittrell et al. | |
| 7,745,810 B2 | 6/2010 | Rueckes et al. | |
| 7,750,240 B2 | 7/2010 | Jiang et al. | |
| 7,846,414 B2 | 12/2010 | Harbec et al. | |
| 7,897,248 B2 | 3/2011 | Barrera et al. | |
| 7,906,208 B2 | 3/2011 | Poulin et al. | |
| 7,938,996 B2 | 5/2011 | Baughman et al. | |
| 8,071,906 B2 | 12/2011 | Smiljanic et al. | |
| 2001/0003576 A1 | 6/2001 | Klett et al. | 423/445 |
| 2002/0004028 A1 | 1/2002 | Margrave et al. | 423/447.3 |
| 2002/0040900 A1 | 4/2002 | Arx et al. | |
| 2002/0102203 A1 | 8/2002 | Smalley et al. | 423/447.3 |
| 2002/0113335 A1 | 8/2002 | Lobovsky et al. | 264/184 |
| 2002/0130610 A1 | 9/2002 | Gimzewski et al. | |
| 2002/0136681 A1 | 9/2002 | Smalley et al. | 423/447.2 |
| 2002/0159943 A1 | 10/2002 | Smalley et al. | 423/447.1 |
| 2002/0179564 A1 | 12/2002 | Geobegan et al. | |
| 2003/0036877 A1 | 2/2003 | Schietinger | 702/134 |
| 2003/0082094 A1 | 5/2003 | Loutfy et al. | |
| 2003/0109619 A1 | 6/2003 | Keller et al. | 524/440 |
| 2003/0122111 A1 | 7/2003 | Glatkowski | |
| 2003/0133865 A1 | 7/2003 | Smalley et al. | |
| 2003/0134916 A1 | 7/2003 | Hrubesh | |
| 2003/0165648 A1 | 9/2003 | Lobovsky et al. | 428/36.9 |
| 2003/0222015 A1 | 12/2003 | Oyama et al. | 210/500.21 |
| 2003/0230169 A1 | 12/2003 | Dunmead et al. | 75/369 |
| 2004/0020681 A1 | 2/2004 | Hjortstam et al. | |
| 2004/0053780 A1 | 3/2004 | Jiang et al. | 502/182 |
| 2004/0081758 A1 | 4/2004 | Mauthner et al. | |
| 2004/0096389 A1 | 5/2004 | Lobovsky et al. | 423/447.1 |
| 2004/0124772 A1 | 7/2004 | Chen | |
| 2004/0146642 A1 | 7/2004 | Josephy et al. | 427/248.1 |
| 2004/0150312 A1 | 8/2004 | McElrath et al. | |
| 2004/0177451 A1 | 9/2004 | Poulin et al. | |
| 2004/0223901 A1 | 11/2004 | Smalley et al. | |
| 2004/0234444 A1 | 11/2004 | Shaffer et al. | |
| 2004/0240144 A1 | 12/2004 | Schott et al. | |
| 2004/0265212 A1 | 12/2004 | Varadan et al. | |
| 2004/0265489 A1 | 12/2004 | Dubin | |
| 2004/0266065 A1 | 12/2004 | Zhang et al. | |
| 2005/0006801 A1 | 1/2005 | Kinloch et al. | 264/5 |
| 2005/0046017 A1 | 3/2005 | Dangelo | 257/720 |
| 2005/0061249 A1 | 3/2005 | Miyahara et al. | |
| 2005/0063658 A1 | 3/2005 | Crowley | |
| 2005/0067406 A1 | 3/2005 | Rjarajan et al. | |
| 2005/0074569 A1 | 4/2005 | Lobovsky et al. | 428/36.9 |
| 2005/0079119 A1 | 4/2005 | Kawakami | |
| 2005/0079349 A1 | 4/2005 | Hampden-Smith et al. | 428/402 |
| 2005/0087222 A1 | 4/2005 | Muller-Werth | |
| 2005/0104258 A1 | 5/2005 | Lennhoff | 264/465 |
| 2005/0112051 A1 | 5/2005 | Liu et al. | |
| 2005/0118090 A1 | 6/2005 | Shaffer et al. | |
| 2005/0163696 A1 | 7/2005 | Uhm et al. | |
| 2005/0170089 A1 | 8/2005 | Lashmore et al. | 427/248.1 |
| 2005/0269726 A1 | 12/2005 | Matabayas, Jr. | |
| 2006/0067871 A1 | 3/2006 | Hart et al. | 423/447.3 |
| 2006/0118158 A1 | 6/2006 | Zhang et al. | |
| 2006/0127299 A1 | 6/2006 | Harbec et al. | |
| 2006/0147369 A1 | 7/2006 | Bi et al. | 423/594.17 |
| 2006/0252853 A1 | 11/2006 | Ajayan et al. | |
| 2006/0269670 A1 | 11/2006 | Lashmore et al. | 427/249.1 |
| 2006/0272701 A1 | 12/2006 | Ajayan et al. | |
| 2007/0009421 A1 | 1/2007 | Kittrell et al. | |
| 2007/0029291 A1 | 2/2007 | Boulos et al. | |
| 2007/0036709 A1 | 2/2007 | Lashmore et al. | |
| 2007/0048211 A1 | 3/2007 | Jiang et al. | |
| 2007/0056855 A1 | 3/2007 | Lo et al. | |
| 2007/0087121 A1 | 4/2007 | Chang et al. | |
| 2007/0092431 A1 | 4/2007 | Resasco et al. | |
| 2007/0116627 A1 | 5/2007 | Collier et al. | |
| 2007/0116631 A1 | 5/2007 | Li et al. | |
| 2007/0140947 A1 | 6/2007 | Schneider et al. | |
| 2007/0151744 A1 | 7/2007 | Chen | 174/110 |
| 2007/0166223 A1 | 7/2007 | Jiang et al. | |
| 2007/0183959 A1 | 8/2007 | Charlier et al. | |
| 2007/0232699 A1 | 10/2007 | Russell et al. | |
| 2007/0236325 A1 | 10/2007 | Bertin et al. | |
| 2007/0277866 A1 | 12/2007 | Sander et al. | |
| 2007/0287202 A1 | 12/2007 | Maehashi et al. | |
| 2007/0293086 A1 | 12/2007 | Liu et al. | |
| 2008/0170982 A1 | 7/2008 | Zhang et al. | |
| 2008/0238882 A1 | 10/2008 | Sivarajan et al. | |
| 2009/0042455 A1 | 2/2009 | Mann et al. | |
| 2009/0044848 A1 | 2/2009 | Lashmore et al. | |
| 2009/0047513 A1 | 2/2009 | Lashmore | |
| 2009/0059535 A1 | 3/2009 | Kim et al. | |
| 2009/0075545 A1 | 3/2009 | Lashmore et al. | |
| 2009/0101505 A1 | 4/2009 | Marino | |
| 2009/0117025 A1 | 5/2009 | Lashmore et al. | |
| 2009/0169819 A1 | 7/2009 | Drzaic et al. | |
| 2009/0194525 A1 | 8/2009 | Lee et al. | |
| 2009/0237886 A1 | 9/2009 | Iwai et al. | |

(56) References Cited

U.S. PATENT DOCUMENTS

| | | | |
|---|---|---|---|
| 2009/0246408 | A1 | 10/2009 | Chan et al. |
| 2009/0269511 | A1 | 10/2009 | Zhamu et al. |
| 2009/0277897 | A1 | 11/2009 | Lashmore et al. |
| 2009/0311167 | A1 | 12/2009 | Height et al. |
| 2010/0041297 | A1 | 2/2010 | Jiang et al. |
| 2010/0196249 | A1 | 8/2010 | Hata et al. |
| 2010/0219383 | A1 | 9/2010 | Eklund |
| 2010/0220074 | A1 | 9/2010 | Irvin, Jr. et al. |
| 2010/0243295 | A1 | 9/2010 | Allemand et al. |
| 2010/0252184 | A1 | 10/2010 | Morimoto et al. |
| 2010/0270058 | A1 | 10/2010 | Mahoney et al. |
| 2010/0296983 | A1 | 11/2010 | Shiraki et al. |
| 2010/0300358 | A1 | 12/2010 | Smiljanic et al. |
| 2010/0328845 | A1 | 12/2010 | Hiralal et al. |
| 2011/0007477 | A1 | 1/2011 | Xu et al. |
| 2011/0027162 | A1 | 2/2011 | Steiner et al. |
| 2011/0316183 | A1 | 12/2011 | Lashmore et al. |
| 2012/0045385 | A1 | 2/2012 | Lashmore et al. |
| 2012/0118552 | A1 | 5/2012 | White et al. |

FOREIGN PATENT DOCUMENTS

| | | |
|---|---|---|
| EP | 2365117 | 9/2011 |
| JP | 58-180615 | 10/1983 |
| JP | 60-027700 | 2/1985 |
| JP | 8 035069 | 2/1996 |
| JP | 2000-058228 | 2/2000 |
| JP | 2003-298338 | 10/2003 |
| JP | 2004-315297 | 11/2004 |
| JP | 2005-075672 | 3/2005 |
| JP | 2005-109870 | 4/2005 |
| JP | 2005/281672 | 10/2005 |
| JP | 2006-335604 | 12/2006 |
| JP | 2002-515847 | 5/2008 |
| KR | 2005-0007886 | 1/2005 |
| WO | WO 98/39250 | 9/1998 |
| WO | WO 02/055769 | 7/2002 |
| WO | 03/004741 | 1/2003 |
| WO | WO 03/080905 | 10/2003 |
| WO | WO 2005/098084 | 10/2005 |
| WO | 2006/025393 | 3/2006 |
| WO | WO 2006/052039 | 5/2006 |
| WO | WO 2006/073460 | 7/2006 |
| WO | WO 2006/099156 | 9/2006 |
| WO | WO 2007/003879 | 1/2007 |
| WO | WO 2007/015710 | 2/2007 |
| WO | WO 2007/086909 | 8/2007 |
| WO | WO 2007/089118 | 8/2007 |
| WO | WO 2008/036068 | 3/2008 |
| WO | WO 2008/048286 | 4/2008 |
| WO | 2009/072478 | 6/2009 |
| WO | 2010/036405 | 4/2010 |

OTHER PUBLICATIONS

Biro, et al., Direct synthesis of multi-walled and single-walled carbon nanotubes by spray-pyrolysis, J. Optoelectronics and Advanced Materials 2003; 5(3): 661-666.*
Moisala, et al., Single-walled carbon nanotube synthesis using ferrocene and iron pentacarbonyl in a laminar flow reactor, Chemical Engineering Science 2006; 61: 4393-4402.*
Ci, et al., Carbon nanofibers and single-walled carbon nanotubes prepared by the floating catalyst method, Carbon 2001; 39: 329-335.*
R.T.K. Baker et al., *"Nucleation and Growth of Carbon Deposits from the Nickel Catalyzed Decomposition of Acetylene"*, Journal of Catalysis, 26:51-62 (1972).
H.W. Kroto et al., *"C60: Buckminsterfullerene"*, Letters to Nature, 318:162-163, (1985).
Sumio Iijima, *"Helical microtubules of graphitic carbon"*, Letters to Nature, 354:56-58, (1991).
D.S. Bethune et al., *Cobalt-catalyzed growth of carbon nanotubes with single-atomic-layer walls*, Letters to Nature, 363:605-607 (1993).
M. Jose-Yacaman et al., *"Catalytic growth of carbon microtubules with fullerene structure"*, Applied Physics Letters, 62(6):657-659 (1993).
Gun-Do Lee et al, *"Catalytic decomposition of acetylene on Fe(001): A first-principles study"*, The American Physical Society, Physical Review B66 081403R:1-4 (2002).
N. Seo Kim et al., *"Dependence of the Vertically Aligned Growth of Carbon Nanotubes on the Catalysts"*, The Journal of Physical Chemistry, 106(36):9286-9290 (2002).
H. W. Zhu et al., *"Direct Synthesis of Long Single-Walled Carbon Nanotube Strands"*, Science, 296:884-886 (2002).
Ki-Hong Lee et al., *"Control of growth orientation for carbon nanotubes"*, Applied Physics Letters, 82(3): 448-450, (2003).
E. F. Kukovitsky et al., *"CVD growth of carbon nanotube films on nickel substrates"*, Applied Surface Science, 215:201-208 (2003).
Gou, J.G., *"Single-Walled Carbon Nanotube Bucky Paper/Epoxy Composites: Molecular Dynamics Simulation and Process Development"*, PhD dissertation, The Florida State University, 2002, p. 9126.
Li, et al. *"Direct Spinning of Carbon Nanotube Fibers from Chemical Vapor Deposition Synthesis"*, Science Magazine, 2004, vol. 304, pp. 276-278.
Okabe, T. et al., *New Porous Carbon Materials, Woodceramics: Development and Fundamental Properties,* Journal of Porous Materials, vol. 2, pp. 207-213, 1996.
Seung-Yup Lee et al., *Synthesis of Carbon Nanotubes Over Gold Nanoparticle Supported Catalysts,* Carbon, 43 (2005), pp. 2654-2663.
International Search Report based on PCT/US2008/067171 dated Sep. 11, 2008.
International Search Report based on PCT/US2008/067170 dated Oct. 1, 2008.
International Search Report based on PCT/US2008/067173 dated Oct. 1, 2008.
European Search Report based on EP 11168621.8 dated Jul. 8, 2011.
International Search Report and Written Opinion mailed Nov. 20, 2012 for PCT/US2012/048665.
Jiang, et al., "Spinning Continuous Carbon Nanotube Yarns", Nature, Oct. 24, 2002, vol. 419, p. 801.
Communication pursuant to Article 94(3) EPC based on EP06849762.7 mailed Sep. 16, 2010.
Non-Final Office Action in U.S. Appl. No. 12/187,278 mailed Sep. 29, 2010.
Non-Final Office Action in U.S. Appl. No. 12/038,408 mailed Oct. 14, 2010.
Non-Final Office Action in U.S. Appl. No. 12/437,537 mailed Oct. 25, 2010.
Final Office Action in U.S. Appl. No. 12/191,765 mailed Oct. 28, 2010.
Supplementary European Search Report based on EP 06851553.5 dated Nov. 15, 2010.
Seo et al., "Synthesis and manipulation of carbon nanotubes," New Journal of Physics. 5: 120.1-120.22 (2003).
International Search Report for International Patent Application No. PCT/US12/48665 mailed Nov. 20, 2012. (013102).
International Search Report for International Patent Application No. PCT/US12/48700 mailed Apr. 5, 2013. (013104).
Office Action issued for U.S. Appl. No. 13/191,109 mailed on Mar. 28, 2013. (011008).
International Search Report for International Patent Application No. PCT/US2012/020194 mailed May 1, 2012.
Gou, J.G., *"Passage: Nanotube Bucky Papers and Nanocomposites"*, Ph.D. Dissertation, Marburg An Der Lahn, pp. 93-126, Jan. 1, 2002.
Hanson, G.W., "Fundamental Transmitting Properties of Carbon Nanotube Antennas", IEEE Transactions on Antennas and Propagation, vol. 53, No. 11, pp. 3426-3435, Nov. 2005.
Merriam Webster Dictionary definition of "along", available at http://merriam-webster.com/dictionary/along (retrieved Sep. 16, 2010).
"Metallurgical & Chemical Engineering", McGraw Publishing Co., vol. 15, No. 5, pp. 258-259, Dec. 15, 1916.
Schaevitz et al., *"A Combustion-Based Mems Thermoelectric Power Generator"*, The 11th Conference on Solid-State Sensors and Actuators, Munich, Germany, Jun. 10-14, 2001.

(56) References Cited

OTHER PUBLICATIONS

Xiao et al., "*High-Mobility Thin-Film Transistors Based on Aligned Carbon Nanotubes*", Applied Physics Letters, vol. 83, No. 1, pp. 150-152, Jul. 7, 2003.
Office Action cited in U.S. Appl. No. 11/413,512 mailed Jul. 8, 2010.
Office Action cited in U.S. Appl. No. 11/415,927 mailed Feb. 22, 2010.
Office Action cited in U.S. Appl. No. 11/415,927 mailed Sep. 9, 2010.
Office Action cited in U.S. Appl. No. 11/715,756 mailed Jan. 25, 2010.
Office Action cited in U.S. Appl. No. 11/818,279 mailed Jun. 2, 2010.
Office Action cited in U.S. Appl. No. 12/187,278 mailed Jun. 11, 2010.
Office Action cited in U.S. Appl. No. 12/191,765 mailed May 14, 2010.
Office Action cited in U.S. Appl. No. 12/390,906 mailed Jul. 9, 2010.
International Search Report based on PCT/US2009/043209 dated Mar. 3, 2010.
International Search Report based on PCT/US2010/041374 dated Sep. 8, 2010.
European Search Report based on EP 06849762.7 dated Jan. 14, 2010.
Australian Examiner's Report cited in AU Serial No. 2006249601 dated Jun. 24, 2010.
Australian Examiner's Report cited in AU Serial No. 2006350110 dated Feb. 9, 2010.
Pipes et al., "Helical carbon nanotube arrays: mechanical properties," Composites Science and Technology. 62: 419-428 (2002).
Canadian Search Report for Canadian Patent Application No. 2,609,712 mailed Jul. 30, 2012.
European Search Report for European Patent Application No. 10160098.9 mailed Mar. 9, 2012.
European Search Report for European Patent Application No. 12160856.6 mailed May 10, 2012.
European Search Report for European Patent Application No. 08726128.5 mailed Aug. 10, 2012.
International Search Report for International Patent Application No. PCT/US12/33300 mailed Jul. 5, 2012.
Office Action issued for Australian Patent Application No. 2008311234 mailed on Feb. 14, 2012.
Office Action issued for U.S. Appl. No. 12/038,408 mailed on Feb. 23, 2012.
Office Action issued for U.S. Appl. No. 12/580,994 mailed on Mar. 12, 2012.
Office Action issued for U.S. Appl. No. 12/437,538 mailed on Mar. 26, 2012.
Office Action issued for U.S. Appl. No. 12/566,229 mailed on May 4, 2012.
Office Action issued for U.S. Appl. No. 12/437,535 mailed on Aug. 22, 2012.
Ci et al., "Preparation of carbon nanofibers by the floating catalyst method," *Carbon*, 38(14), pp. 1933-1937 (Sep. 18, 2000).
Tibbetts, "Vapor-grown carbon fibers: Status and prospects," *Carbon*, 27(5), pp. 745-747 (1989).
Non-Final Office Action in U.S. Appl. No. 12/170,092 mailed Nov. 21, 2011.
Non-Final Office Action in U.S. Appl. No. 12/841,768 mailed May 26, 2011.
International Search Report issued in International Application No. PCT/US13/35844 mailed on Jul. 12, 2013.
Japanese Office Action issued in Japanese Application No. 2008-540155 mailed on Nov. 4, 2011.
Japanese Office Action issued in Japanese Application No. 2009-551705 mailed on May 29, 2012.
Japanese Office Action issued in Japanese Application No. 2010-518417 mailed on Sep. 10, 2013.
Japanese Office Action issued in Japanese Application No. 2011-508688 mailed on Nov. 19, 2013.
Office Action issued in U.S. Appl. No. 12/390,906 mailed on Sep. 30, 2013.
Office Action issued in U.S. Appl. No. 12/437,538 mailed on Nov. 26, 2013.
Japanese Office Action issued in Japanese Application No. 2008-540155 mailed on Mar. 8, 2011.
Office Action issued in U.S. Appl. No. 13/560,582 mailed on Jun. 19, 2014.
Office Action issued in U.S. Appl. No. 13/294,698 mailed on Jul. 17, 2014.
Office Action issued in U.S. Appl. No. 13/191,109 mailed on Oct. 27, 2014.
Official Action in JP Serial No. 2008-540155 dated Mar. 8, 2011.
Non-Final Office Action in U.S. Appl. No. 11/415,927 mailed Mar. 10, 2011.
Non-Final Office Action in U.S. Appl. No. 12/180,300 mailed Mar. 16, 2011.
Non-Final Office Action in U.S. Appl. No. 12/191,765 mailed Apr. 4, 2011.
Non-Final Office Action in U.S. Appl. No. 12/566,229 mailed Apr. 6, 2011.

\* cited by examiner

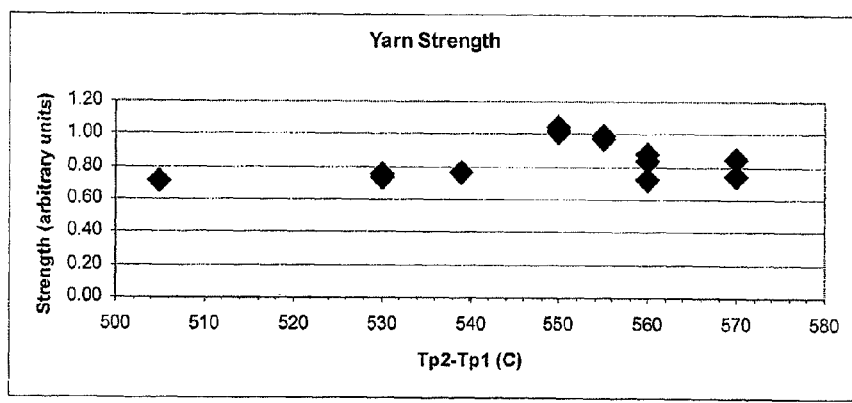
Fig. 2 illustrates yarn strength in arbitrary units as a function of the thermal gradient near the end of the injector.

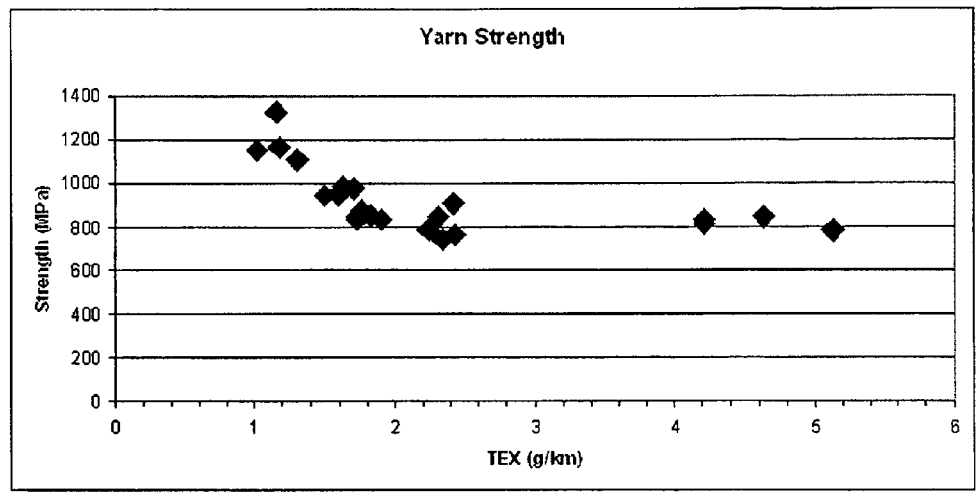
Fig. 3 illustrates yarn strength as a function of Tex for different fuel types.
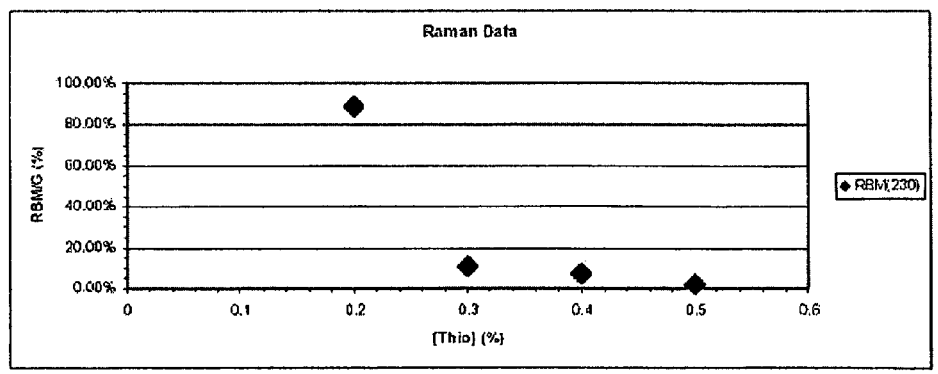
Fig. 4 the Raman data on the intensity of the RBM/G band as a function of one of the fuel additives.

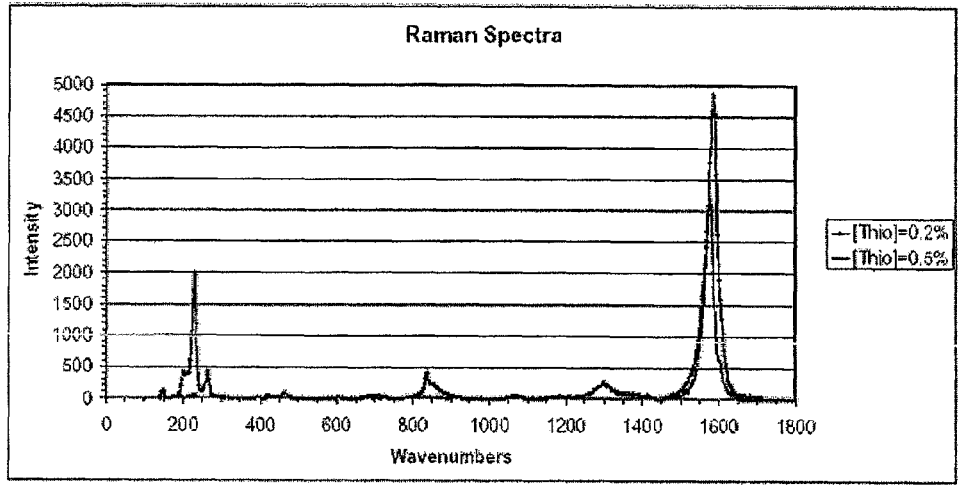
Fig. 5 The complete Raman Spectra for two different thiophene concentrations. Note similar D/G ratios but very different SWCNT concentrations evidenced by the large intensity radial breathing modes between 200 and 800 wavenumbers.
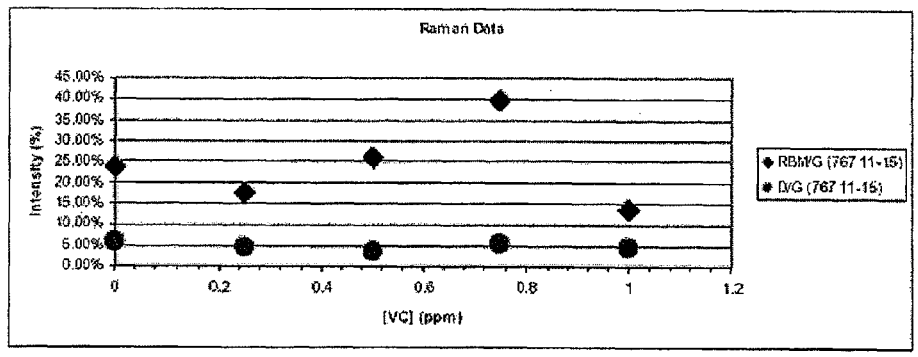
Fig. 6 The effect of additiosn to the fuel (VC) on the RMBs and the D/G ratio.

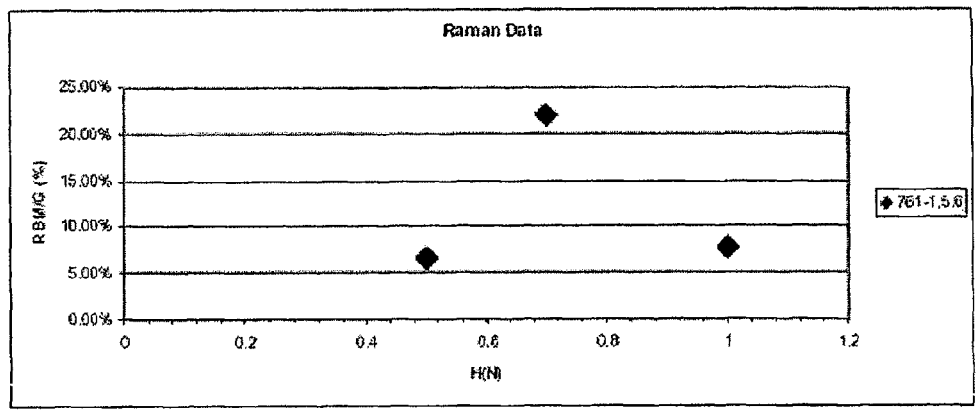
Fig. 7 The effect of hydrogen flow through the nebulizer on the radial breathing mode presence measure in percent of the G band intensity.
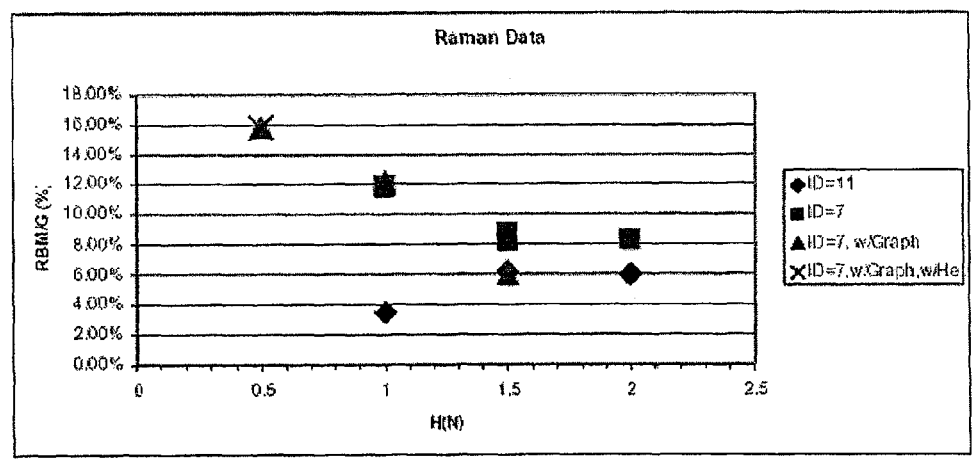
Fig. 8 The effect of hydrogen flow through the nebulizer on the RBM's for different entrance tube diameters (11mm and 7mm - internal).

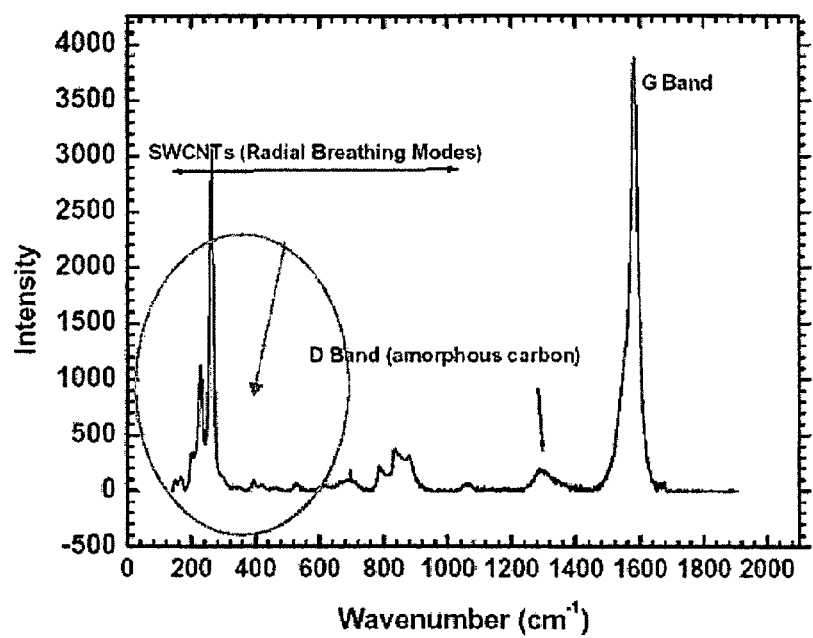
Fig. 9A A Raman spectra of a fully optimized system is shown above with the various peaks labeled.

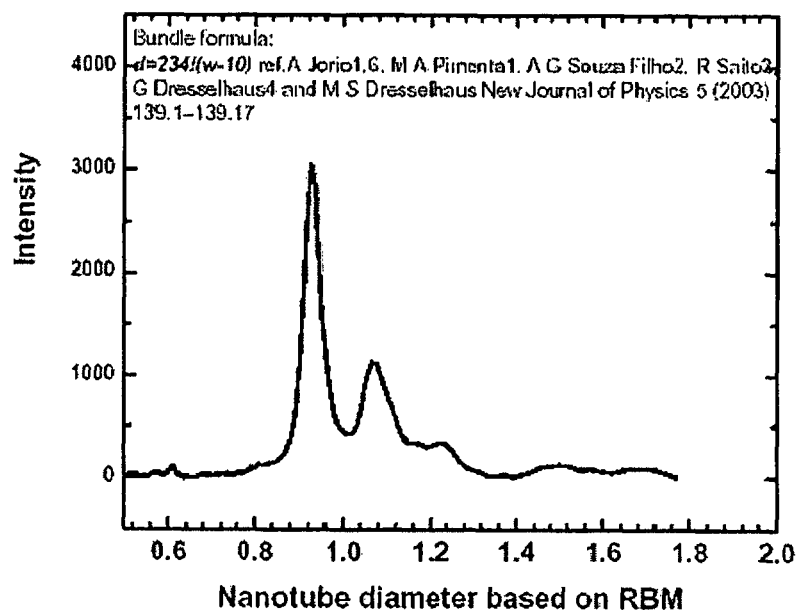
Fig. 9B Graph of the RBM region of the spectra, basically a histogram of the diameter distribution.

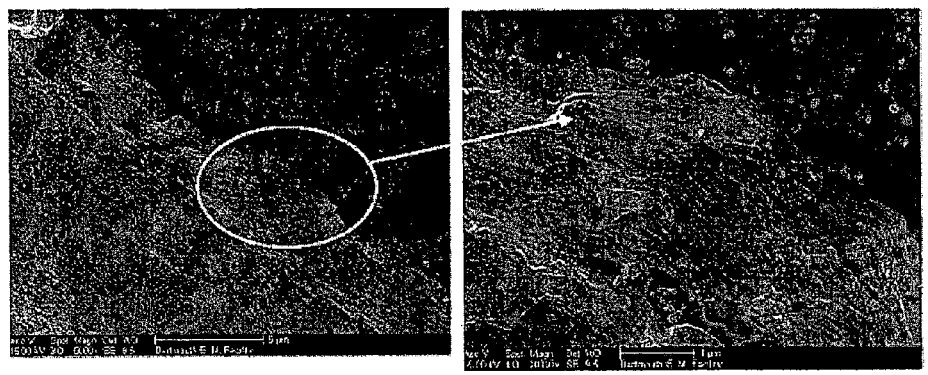
Fig. 10 An SEM micrograph of optimized growth showing some spontaneous alignment of the tubes and a very clean microstructure.

A TEM micrograph showing some very small tubes,
ropes made of small tubes, some larger SWCNT tubes
and an average amount of catalyst and a minimal amount
of amorphous carbon all consistent with the Raman spectra.

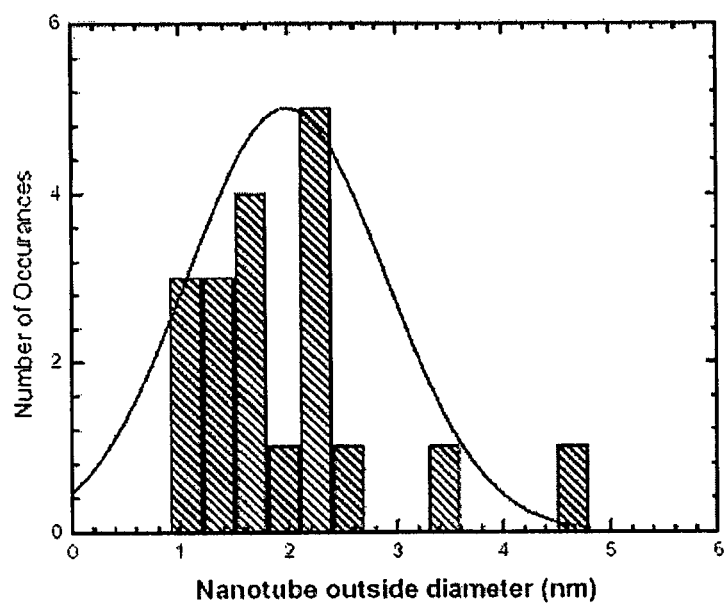
Fig. 12 A histogram of nanotube diameters measured from the TEM fitted to a normalized distribution.

INJECTOR APPARATUS AND METHODS FOR PRODUCTION OF NANOSTRUCTURES

RELATED U.S. APPLICATION(S)

The present application claims priority to Provisional Application Ser. No. 60/934,655, filed Jun. 15, 2007, which application is hereby incorporated herein by reference.

GOVERNMENT SUPPORT

The invention was supported, in whole or in part, by Contract No. W911-QY-06-C-0026 from the U.S. Army Soldier Systems Center (Natick, Mass.). The Government may have certain rights in the invention.

TECHNICAL FIELD

The present invention relates to systems for generating carbon nanostructures, and more particularly, to reactors having an injector apparatus for optimizing growth conditions for the generation of carbon nanostructures.

BACKGROUND ART

The production of long, substantially defect-free carbon nanotubes (CNTs) may be necessary to make usable materials that can retain the desirable properties of individual nanotubes. In general, nanotube growth may be limited by various growth conditions, including (1) fuel starvation, (2) catalyst size and stability, (3) carbon diffusion rates on the catalyst surfaces, (4) nature of the reaction gas, (5) duration within the reaction zone, and (6) temperature of the reaction zone.

It has been observed that nanotube growth seems to be non-linear with residence time within a reactor. In addition, it has been observed that larger catalysts tend to exhibit substantially no growth. To that end, termination of growth may be correlated to the change in the catalyst particle size during nanotube growth.

Optimization of growth parameters, including those indicated above, has recently led to a measurable increase in carbon nanotube production and strength of material made from these nanotubes. One primary parameter which appears to be related to strength is length of the nanotube. For example, long samples of yarns (i.e., intertwined or spun carbon nanotubes), some over about 10 meters in length, with a strength of over about 1.4 GPa have been produced. However, even at such length, there may still be about 5 to about 10 times less than the potential material strength of a yarn, when based on individual tube strength estimated at about 30 GPa. Creating longer individual nanotubes should translate into material strengths that more closely approach the average strength of individual nanotubes.

Accordingly, it would be desirable to provide a system and method capable of controlling specific parameters necessary for optimizing growth, as well as enhancing the strength of materials made from the nanotubes being produced.

SUMMARY OF THE INVENTION

The present invention provides, in one embodiment, a an apparatus for use with a system, such as a chemical vapor deposition (CVD) reactor, in the production of nanostructures, for example, nanotubes.

The apparatus, in an embodiment, includes a chamber having one end in fluid communication with the reactor and defining a pathway along which a fluid mixture for the synthesis of nanostructures can be injected into the reactor. The apparatus also has a tube in fluid communication with an opposite of the chamber to impart a venturi effect in order to generate from the fluid mixture small droplets prior to introducing the fluid mixture into the chamber. A heating zone is situated downstream from the tube to provide a temperature range sufficient to permit the formation, from components within the fluid mixture, of catalyst particles upon which nanostructures can be generated. A mechanism is further provided at a distal end of the chamber to minimize turbulent flow as the fluid mixture exits the chamber, and to impart a substantially laminar flow thereto.

The present invention also provided a method that can improve the growth process of carbon nanotubes sufficient to generate substantially pure and high quality single wall carbon nanotubes (SWNT). The method includes vaporizing a mixture of a catalyst precursor, a conditioning compound, and a carbon source into a plurality of small droplets. Next, the vaporized mixture may be heated to a first temperature range sufficient to decompose the catalyst precursor to permit generation of catalyst particles. Thereafter, the vaporized mixture may be raised to a second temperature range sufficient to decompose the conditioning compound for subsequent interaction with the catalyst particles in order to control size distribution of the catalyst particles. Subsequently, the conditioned catalyst particles may be introduced into a reaction environment. Then the vaporized mixture may be elevated to a third temperature range sufficient to decompose the carbon source into its constituent atoms. Upon reaching the third temperature range, the carbon atoms may be permitted to interact with the catalyst particles to allow growth of nanostructures on the catalyst particles.

BRIEF DESCRIPTION OF DRAWINGS

FIG. 2 illustrates yarn strength in arbitrary units as a function of the thermal gradient near the end of the injector.

FIG. 3 illustrates yarn strength as a function of Tex for different fuel types.

FIG. 4 illustrates Raman data on the intensity of RBM/G band as a function of one of the fuel additives.

FIG. 5 illustrates a comparison of Raman spectra for two different thiophene concentrations.

FIG. 6 illustrates the effect of additives to the fuel on the RMBs and D/G ratios.

FIG. 7 illustrates the effect of hydrogen flow through the nebulizer on the radial breathing mode presence measured in percentage of the G band intensity.

FIG. 8 illustrates the effect of hydrogen flow through the nebulizer on the RBMs for different entrance tube diameters.

FIG. 9A illustrates a Raman spectra of a fully optimized system.

FIG. 9B illustrates an RBM region of the Raman spectra, specifically a histogram of the diameter distribution.

FIG. 10 illustrates an SEM micrograph of optimized growth showing spontaneous alignment of the tubes and a clean microstructure.

FIG. 12 illustrates a histogram of nanotube diameters measured from the TEM fitted to a normalized distribution.

DESCRIPTION OF SPECIFIC EMBODIMENTS

Figure 1A:
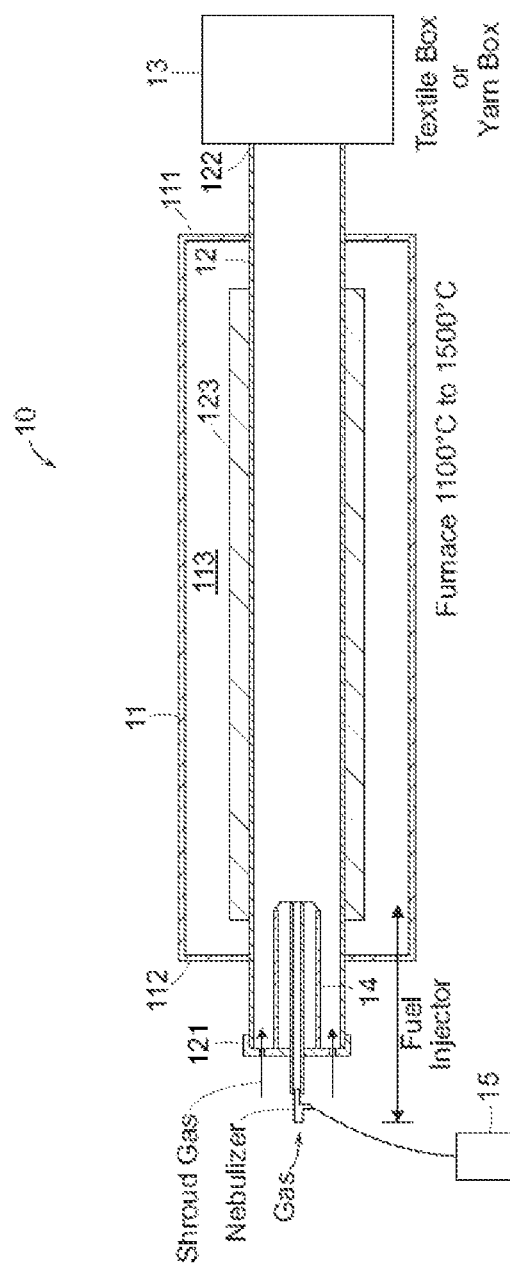
FIG. 1A illustrates a schematic diagram of a CVD system for production of nanostructures in connection with an embodiment of the present invention.

Nanotubes for use in connection with the present invention may be fabricated using a variety of approaches. Presently, there exist multiple processes and variations thereof for growing nanotubes. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation. It should be noted that although reference is made below to nanotube synthesized from carbon, other compound(s) may be used in connection with the synthesis of nanotubes for use with the present invention. Other methods, such as plasma CVD or the like are also possible. It is understood that boron nanotubes may also be growth in a similar system but with different chemical precursors.

The present invention, in one embodiment, employs a CVD process or similar gas phase pyrolysis procedures known in the industry to generate the appropriate nanostructures, including nanotubes. In particular, since growth temperatures for CVD can be comparatively low ranging, for instance, from about 400° C. to about 1400° C., carbon nanotubes, both single wall (SWNT) or multiwall (MWNT), may be grown. These carbon nanotubes may be grown, in an embodiment, from nanostructural catalyst particles introduced into reagent carbon-containing gases (i.e., gaseous carbon source), either by addition of existing particles or by in situ synthesis of the particles from, for instance, a metal-organic precursor, or even non-metallic catalysts. Although both SWNT and MWNT may be grown, in certain instances, SWNT may be preferred because of their higher growth rate and tendency to form ropes which may offer handling, safety and strength advantages.

The strength of the individual SWNT and MWNT generated for use in connection with the present invention may be about 30 GPa or more. Strength, as should be noted, can be sensitive to defects. However, the elastic modulus of the SWNT and MWNT fabricated for use with the present invention is typically not sensitive to defects and can vary from about 1 to about 1.2 TPa. Moreover, the strain to failure, which generally can be a structure sensitive parameter, may range from a few percent to a maximum of about 12% in the present invention.

Furthermore, the nanotubes of the present invention can be provided with relatively small diameter, so that relatively high capacitance can be generated. In an embodiment of the present invention, the nanotubes of the present invention can be provided with a diameter in a range of from less than 1 nm to about 10 nm. It should be appreciated that the smaller the diameter of the nanotubes, the higher the surface area per gram of nanotubes can be provided, and thus the higher the capacitance that can be generated. For example, assuming a 50 micro-Farads per cm capacitance for graphene and a density of about 1.5 g/cc for the SWNT, capacitance can be calculated using the following formula:

$$\text{Capacitance(Farads/gram)} = 1333/d(\text{nm})$$

Therefore, assuming a uniform textile of 1 nm diameter tubes with no shielding, then a specific capacitance of 1333 Farads per gram should be feasible, neglecting the loss in surface area when ropes are formed and neglecting the loss of active area for the nanotubes that are shielded by their neighbors.

Since many important properties of carbon nanotubes (CNT) depend on diameter, including the growth rate, focusing on relatively small diameter catalyst particles can result in carbon nanotubes with correspondingly small diameters.

To do so, in one embodiment of the present invention, a diode laser Raman spectrometer was used to enhance the study and understanding of CNT growth parameter and the effects on the resulting structure. In general, three measures of quality were used, including: (1) the existence of Radial Breathing Modes (RBM), particularly those of smaller diameter, (2) the intensity of these modes relative to G Band (i.e., Graphene peak), and (3) the ratio of the D Band to the G Band (i.e., Disorder peak (~1300 $cm^{-1}$) to the Graphene peak (~1580 $cm^{-1}$)).

It should be noted that a smaller D/G can indicate relatively fewer $sp^3$ bonds, and therefore fewer defects. Typically the D Band ($sp^3$) can be a result of amorphous carbon, though it could also suggest defects in the tubes. The intensity of the Radial Breathing Modes (RBMs) relative to the G band, on the other hand, can be indicative of the relative amount of Single Walled Nanotubes (SWNTs) in the sample, while the relative intensities of the various RBMs can give an indication of the diameter distribution of the tubes. These considerations, in conjunction with, for example, Transmission Electron Microscopy (TEM) and tensile testing, as provided hereinafter in detail, have allowed for optimization of the manufacturing process of the present invention, which resulted in relatively stronger and longer carbon nanostructures, such as carbon nanotubes (CNTs).

As noted above, one parameter which may have a direct affect on strength of the carbon nanostructures can be the length of the carbon nanotubes. Other parameters have also been examined to determine whether they can assist in providing an efficient growth model for carbon nanostructures. For example, in one approach, using the intensity of the RBM relative to the G band as a guide, a parameter space associated with each furnace, used in connection with the system of the present invention, can be explored quantitatively.

In connection with the present invention, there can be over a dozen different parameters, many of which interact with one another, and many of which may need to be simultaneously optimized for each furnace. Traditionally, to optimize these systems, unless timely and quantitative feedback can be provided, the optimization process can be difficult. However, by observing how the parameters being studied interact and produce changes, for instances, in a Raman spectra, in conjunction with Strength, Efficiency, and TEM/SEM data, a fundamental understanding of the carbon nanostructure growth in the system of the present invention has been established, resulting in an efficient model for the growth of such nanostructures in the system of the present invention.

The System and Injector

In connection with the following experiments, a system similar to that illustrated in FIG. 1A may be employed to analyze the various parameters and subsequently optimize an efficient model for the growth of carbon nanostructures.

System 10, as illustrated in FIG. 1A, includes, in one embodiment, includes housing 11 (i.e., furnace) having opposite ends 111 and 112, and a passageway 113 extending between ends 111 and 112. A tube 12 (i.e., reactor) within which extended length nanostructures may be generated, may be situated within the passageway 113 of housing 11. As shown in FIG. 1A, ends 121 and 122 of tube 12 may be positioned so that they extend from ends 111 and 112 respectively of housing 11. Housing 11, in an embodiment, may including heating elements or mechanisms (not shown) to generate temperature ranging up to from about 1100° C. to about 1500° C., necessary for the growth of carbon nanostructures within tube 12. As the heating elements must maintain the temperature environment within tube 12 to within a specified range during the synthesis of the extended length nanostructures, although not illustrated, the system 10 may be provided with a thermocouple on the exterior of tube 12 to monitor the temperature environment within tube 12. In an embodiment, the maintenance of the temperature range within tube 12, e.g., from about 1000° C. to about 1400° C., may be optimized by the use of an insulating structure 123. Insulating structure 123, in one embodiment, may be made from, for example, zirconia ceramic fibers (e.g., zirconia-stabilized boron nitride). Other insulating materials may, of course, also be used.

As the housing 11 and tube 12 must withstand variations in temperature and gas-reactive environments, housing 11 and tube 12 may be manufactured from a strong, substantially gas-impermeable material that is substantially resistant to corrosion. In an embodiment, the housing 11 and tube 12 may be made from a quartz material. Of course, other materials may be used, so long as the housing 11 and tube 12 can remain impermeable to gas and maintain their non-corrosive character. Also, although illustrated as being cylindrical in shape, housing 11 and tube 12 may be provided with any geometric cross-section.

System 10 may also include a collection unit 13 in fluid communication with end 122 of tube 12 for collecting nanostructures generated from within tube 12. At opposite 121 of tube 12, system 10 may include an injector apparatus 14 (i.e., nebulizer) in fluid communication with tube 12. Injector 14, in an embodiment, may be designed to receive from a reservoir 15 a fluid mixture of components necessary for the growth of nanostructures within tube 12. Injector 14 may also be designed to vaporize or fluidize the mixture (i.e., generating small droplets) before directing the mixture into tube 12 for the generation and growth of nanostructures.

The fluid mixture, in one embodiment, can include, among other things, (a) a catalyst precursor from which a catalyst particle can be generated for subsequent growth of the nanostructure thereon, (b) a conditioner compound for controlling size distribution of catalyst particles generated from the catalyst precursor, and thus the diameter of the nanostructure, and (c) a carbon source for depositing carbon atoms onto the catalyst particle in order to grow the nanostructures.

Examples of a catalyst precursor from which catalyst particles may be generated includes Ferrocene, materials such as iron, iron alloy, nickel or cobalt, their oxides, or their alloys (or compounds with other metals or ceramics). Alternatively, the catalyst particles may be made from metal oxides, such as $Fe_3O_4$, $Fe_2O_4$, or FeO, or similar oxides of cobalt or nickel, or a combination thereof.

Examples of a conditioner compound for use in connection with the fluid mixture of the present invention include Thiophene, $H_2S$, other sulfur containing compounds, or a combination thereof.

Examples of a carbon source for use in connection with the fluid mixture of the present invention include, but not limited to, ethanol, methyl formate, propanol, acetic acid, hexane, methanol, or blends of methanol with ethanol. Other liquid carbon source may also be used, including $C_2H_2$, $CH_3$, and $CH_4$.

Figure 1B:
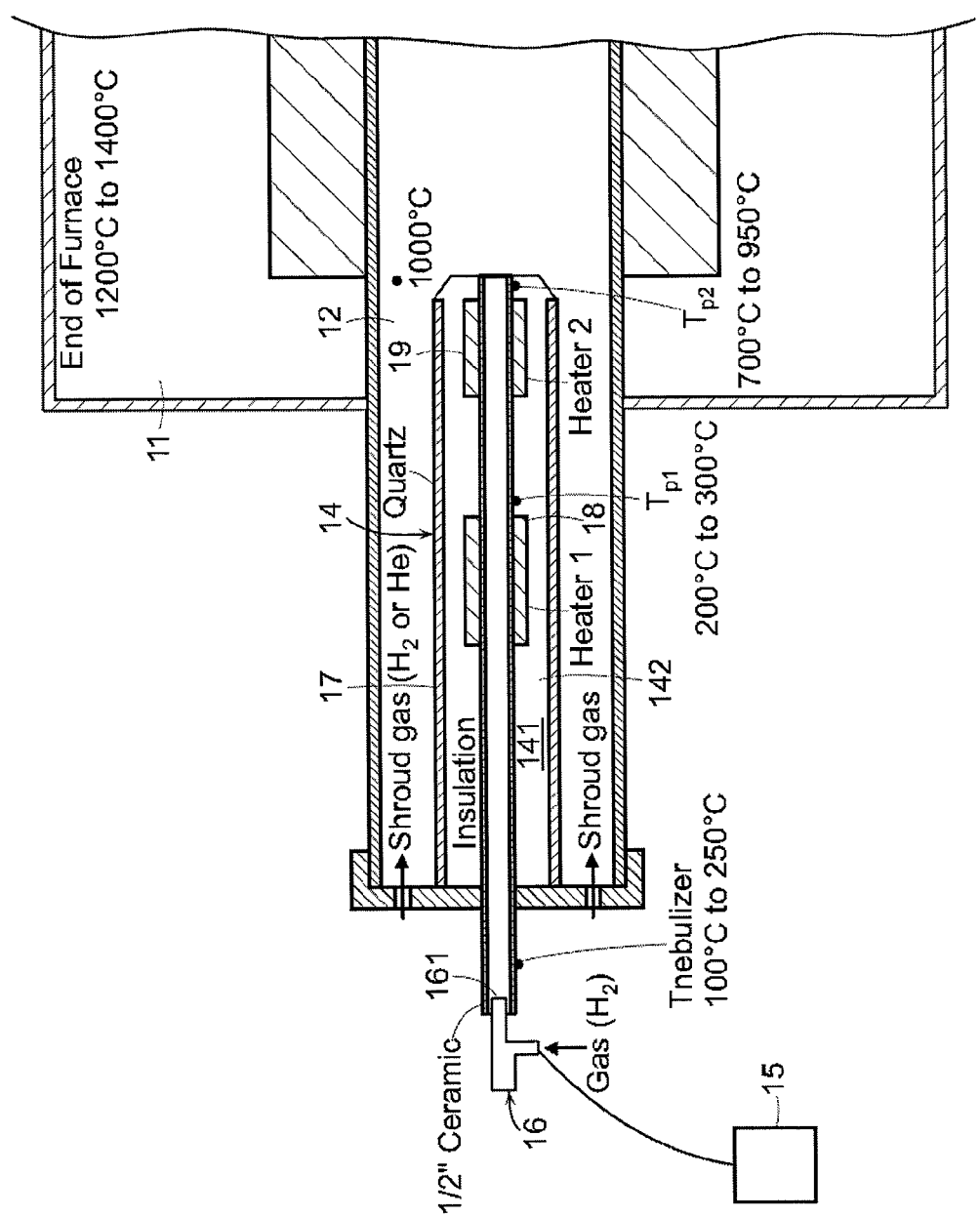
FIG. 1B is a schematic illustration of an injector apparatus for use in connection with the CVD system shown in FIG. 1.

Looking now at FIG. 1B, there is shown a detail illustration of injector 14. Injector 14, in one embodiment, includes a substantially tubular chamber 141 defining a pathway 142 along which the vaporized fluid mixture may be generated and directed into reactor tube 12. To vaporize or fluidize the mixture, injector 14 may include a nebulizing tube 16 designed to impart a venturi effect in order to generate small droplets from the fluid mixture being introduced from reservoir 15. It should be appreciated that, in one embodiment, the vaporizing or fluidizing of the fluid mixture occurs substantially as the fluid exits through distal end 161 of nebulizing tube 16. In an embodiment, the droplets being generated may range from nanoscale in size to microscale in size. To direct the vaporized fluid mixture along the nebulizing tube 16 into the reactor tube 12, in one embodiment, a volume of gas, such as $H_2$, He or any other inert gases, may be used to push the vaporized fluid toward the reactor tube 12.

Although illustrated as substantially tubular, it should be appreciated that injector 14 may be provided with any geometric designs, so long as the injector can accommodate the nebulizing tube 16, and provide a pathway along which the vaporized fluid mixture can be directed into a reactor tube 12.

In addition, it should be noted that the injector 14 of the present invention may be designed to permit introduction of individual components of the fluid mixture into the injector 14 rather than providing them as part of the fluid mixture. In such an embodiment, each component may be individually vaporized, through a nebulizing tube similar to tube 16, and introduced into the injector 14, where they may be allowed to mix and subsequently directed along the injector 14 in a similar manner to that described above.

As injector 14 is situated within a portion of reactor tube 12 and furnace 11, the heat being generated within tube 12 and furnace 11 may have a negative affect on the temperature environment within injector 14. In order to shield injector 14 from the heat in reactor tube 12 and furnace 11, an insulation package 17 may be provided about injector 14. In particular, insulation package 17 may act to preserve the temperature environment along the length of injector 14.

With the presence of insulation package 17, the temperature environment within injector 14 may be lowered to a range which can affect the various reactions necessary for growing nanostructures. To that end, injector 14 may also include a heating zone A situated downstream from the nebulizing tube 16 to provide a temperature range sufficient to permit the formation of catalyst particles from the catalyst precursors. In one embodiment, the heating zone A includes a first heater 18 situated downstream of the distal end 161 of nebulizing tube 16. Heater 18 may be provided to maintain a temperature range at, for instance, Tp1 necessary to decompose the catalyst precursor into its constituent atoms, and which atoms may thereafter cluster into catalyst particles on which nanostructures may subsequently be grown. In order to maintain the temperature range at Tp1 at a level necessary to decompose the catalyst precursor, heater 18, in one embodiment, may be situated slightly downstream of Tp1. In an embodiment where Ferrocene is used as a precursor, its constituent atoms (i.e., iron particles), substantially nanoscaled in size, may be generated when the temperature at Tp1 can be maintained in a range of from about 200° C. to about 300° C.

Heating zone A may further include a second heater 19 positioned downstream of first heater 18, and within furnace 11. Heater 19 may be provided to maintain a temperature range at, for example, Tp2 necessary to decompose the conditioner compound into its constituent atoms. These atoms, in the presence of the clusters of catalyst particles, can interact with the clusters to control the size distribution of the catalyst particles, and hence the diameter of the nanostructures being generated. In an embodiment wherein Thiophene is used as a conditioning compound, sulfur may be released upon decomposition of the Thiophene to interact with the clusters of catalyst particles. Heater 19, in an embodiment, may be designed to maintain a temperature range at Tp2 from about 700° C. to about 950° C. and to maintain such a range at a location slightly downstream of the heater 19.

In accordance with one embodiment of the present invention, Tp2 may be may be located at a desired distance from Tp1. As various parameters can be come into play, the distance from Tp1 to Tp2 should be such that the flow of fluid mixture from Tp1, where decomposition of the catalyst precursor occurs, to Tp2 can optimize the amount of decomposition of the conditioning compound, in order to optimize the size distribution of the catalyst particles.

It should be appreciated that in addition to the particular temperature zones generated by first heater 18 and second heater 19 within injector 14, the temperature at the distal end 161 of nebulizing tube 16 may also need to be maintained within a particular range in the injector 14 in order to avoid either condensation of the vaporized fluid mixture or uneven flow of the fluid mixture as it exits through distal end 161 of nebulizing tube 16. In an embodiment, the temperature at the distal end 161 may need to be maintained between about 100° C. and about 250° C. If, for example, the temperature is below the indicated range, condensation of the fluid mixture may occur along a wall surface of the injector 16. Consequently, the fluid mixture that is directed from the injector 16 into the reactor tube 12 may be substantially different from that of the mixture introduced from reservoir 15. If, for example, the temperature is above the indicated range, boiling of the fluid mixture may occur at the distal end 161, resulting in sputtering and uneven flow of the fluid into the injector 14.

As injector 14 may need to maintain a temperature gradient along its length, whether to minimize condensation of the distal end 161 of the nebulizing tube 16, to maintain the necessary temperature at Tp1 to permit decomposition of the catalyst precursor, or at Tp2 to permit decomposition of the conditioning compound, insulation package 17, in addition to shielding heat from the reactor tube 12 and furnace 11, can act to maintain the desired temperature gradient along injector 14 at each critical location. In one embodiment, the insulation package 17 may be made from quartz or similar materials, or from a porous ceramic material, such as zirconia ceramic fibers (e.g., zirconia-stabilized boron nitride). Other insulating materials may, of course, also be used.

Still looking at FIG. 1B, system 10 may include at least one inlet 191 through which a carrier gas may be introduced into reactor tube 12. The introduction of a carrier gas into tube 12 may assist in moving the fluid mixture along tube 12 subsequent to its exit from injector 14. In addition, as it may be desirable to minimize turbulent flow or vortex flow associated with the fluid mixture as it exits injector 14, the carrier gas may be permitted to flow along the reactor tube 12 and along an exterior surface of injector 14. In an embodiment the carrier gas may be permitted to flow at a speed substantially similar to that of the fluid mixture, as the mixture exits the injector 14, to permit the fluid mixture to maintain a substantially laminar flow. By maintaining a substantially laminar flow, growth and strength of the nanostructures being produced may be optimized. In an embodiment, the carrier gas may be $H_2$, He or any other inert gases.

To further minimize turbulent flow or vortex flow as the fluid mixture exits the injector 14, insulation package 17 may be provided with a substantially tapered design about distal end 141 of injector 14. Alternatively or in addition, an extension (not shown) may be situated about distal end 141 of injector 14 to expand the flow of the fluid mixture substantially radially away from the center of the injector 14 as the fluid mixture exits the distal end 141. The presence of such an extension can slow down flow velocity of the fluid mixture and allow the flow pattern to remain substantially laminar.

It should be appreciated that the injector 14 may be designed to decompose the catalyst precursor at Tp1 and the conditioning compound at Tp2 as the fluid mixture moves along injector 14. However, the carbon source necessary for nanostructure growth does not get decomposed and may remain substantially chemically unchanged as the fluid mixture moves along injector 14.

However, since the distal end 141 of injector 14 protrudes into furnace 11, as seen in FIGS. 1A-B, its proximity to a substantially higher temperature range within the furnace 11, and thus reactor tube 12, can expose the carbon source immediately to a temperature range necessary to decompose the carbon source, upon its exiting through the distal end 141 of the injector 14, for subsequent nanostructure growth. In an embodiment, the temperature range at interface 142 between distal end 141 and furnace 11 may be from about 1000° C. to about 1250° C.

Process

Using the system 10 and injector 14, as illustrated in FIGS. 1A-B, a variety of parameters were examined. In one approach, two sets of parameters were initially examined: (1) the fluid mixture, including the catalyst precursor, the conditioning compound, and the carbon source, which can affect nanostructure growth in a variety of ways, and (2) temperature and geometrical parameters characterizing the injection 14 of the system 10.

Fluid mixture parameters, in an embodiment, can involve a) concentrations of each of the components of the mixtures, including any additives, as well as b) Injection Rate (IR) of the fluid mixture into the system 10. Additional parameters can include flow rates of, for example, $H_2$ or He along the nebulizing tube 16 into the injector 14, as well as the flow rates carrier gas $H_2$ or He into a in the reactor tube 12 surrounding the injector 14.

As for parameters associated with the injector 14 that may affect nanostructure growth, they include the internal diameter (ID) of injector 14, length (L) of injector 14, the distance (Z) from furnace 11 where a nebulizing tube 16 is located, as well as Tp1 and Tp2 the temperatures at two different locations in the injector 14. Moreover, the presence or absence of insulation package 17 around the injector 14 can also be an important variable. It has been noted that these and other parameters that can affect the thermal profile of the injector 14 of system 10 can be critical to the quality and quantity of CNT production. Other parameters that can affect the thermal profile of the injector 14 of the system 10 are provided in Table 1 below, including various parameters associated with collection and spinning of the nanostructures, such as carbon nanotubes.

TABLE 1

| Parameter | [Ferr] | [Thio] | [VC] | IR | $H_R$ | $He_R$ | $H_S$ |
|---|---|---|---|---|---|---|---|
| Effect | Catalyst Quantity | Catalyst Activation | ? | Catalyst Quantity | Catalyst Size | Catalyst Size | Nanotube Quality |
| Interaction | IR Hr | [Ferr]? | [Ferr]? | [Ferr] Hr | [Ferr] IR | ID Tp? | [Ferr] IR |

TABLE 1-continued

| | Hs | [VC]? | [Thio]? | Hs | Hs | Hr |
|---|---|---|---|---|---|---|
| Parameter | $T_F$ | $T_{P1}$ $T_{P2}$ | Z | $L_P$ | $ID_P$ | Insulation |
| Effect | Growth Kinetics | Catalyst Size | Catalyst Size | Catalyst Size | Catalyst Size | Catalyst Size |
| Interaction | Hr + Hs | Z L ID Hr He | Tp Lp Hr He Tf Ins | Tp Z Tf Hr Ins | Tp Hr | Tp Hr |

In general, a number of processes may be occurring in a region between the nebulizing tube 16 and the main furnace 11 of system 10. For instance, initially, the fluid mixture of catalyst precursor, conditioning compound and carbon source may be introduced from reservoir 15 into injector 14 by way of nebulizing tube 16. To assist in directing the mixture along the nebulizing tube 16, an inert gas, such as $H_2$ or He may be used. As the fluid mixture moves along the nebulizing tube 16 and exit therefrom, tube 16 can impart a venturi effect to vaporize the fluid mixture (i.e., generate droplets from the fluid mixture). To minimize any occurrences of condensation or boiling as the fluid mixture exits the nebulizing tube 16, such an area within the injector 14 may be maintained at a temperature level ranging from about 100° C. to about 250° C.

In an embodiment, an additive for the carbon source may be included in the fluid mixture to optimize growth conditions, as well as enhancing the strength of materials made from the nanotubes being produced. Examples of an additive includes $C_{60}$, $C_{70}$, $C_{72}$, $C_{84}$, and $C_{100}$.

The vaporized fluid mixture may then proceed along the injector 14 toward the first heater 18 where the temperature may be maintained at Tp1 at level ranging from about 200° C. to about 300° C., the catalyst precursor within the fluid mixture may be decomposed, releasing its constituent atoms. The decomposition temperature of the catalyst precursor, in an embodiment, can be dependent on the carrier gas (e.g., $H_2$ or He), and may depend on the presence of other species. The constituent atoms may subsequently cluster into catalyst particles of a characteristic size distribution. This size distribution of the catalyst particles can, in general, evolve during migration through the injector 14 and into the furnace 11.

Next, the fluid mixture may proceed further downstream along the injector 14 toward the second heater 19. The second heater 19, in an embodiment, may maintain the temperature at Tp2 at a level ranging from about 700° C. to about 950° C. where the conditioning compound may decompose into its constituent atoms. The constituent atoms of the conditioning compound may then react with the clusters of catalyst particles to effectuate the size distribution of the clusters of catalyst particles. In particular, the constituent atoms of the conditioning compound can act to stop the growth and/or inhibit evaporation of the catalyst particles. In an embodiment, the constituent atoms of the conditioning compounds along with $H_2$ in the injector 14 may interact with the clusters of catalyst particles to affect size distribution of the catalyst particles.

As will be seen by the Experiments provided below, the thermal profile, as well as the concentration profiles of various species can affect the size and stability of the catalyst particles, and therefore the growth of the nanostructures. In addition, the specific size distribution of the clusters of catalyst particles can also be determined by residence time in the injector 14, and the ID of the injector 14.

It should be appreciated that the carbon source within the fluid mixture may remain chemically unchanged or otherwise not decomposed within injector 14, as the fluid mixture travels along the entire length of the injector 14.

The conditioned catalyst particles once moved beyond the second heater 19, may thereafter move across interface 142 between distal end 141 of injector 14 and furnace 11 to enter into the main portion of reactor tube 12. Upon exiting the injector 14, the conditioned catalyst particles, along with the carbon source, may maintain a substantially laminar flow in the presence of a carrier gas, such as $H_2$ or He. In the presence of the carrier gas, the conditioned catalyst particles may be diluted by the volume of carrier gas.

In addition, upon entry into the main portion of the reactor tube 12, where the temperature range within the reactor tube 12 may be maintained at a level sufficient to decompose the carbon source into its constituent carbon atoms, the presence of the carbon atoms can activate nanostructure growth. In an embodiment, the temperature range may be from about 1000° C. to about 1250° C. In general, growth occurs when the carbon atoms attach themselves substantially sequentially upon the catalyst particles to form a nanostructure, such as a carbon nanotube.

Growth of the nanostructures may end when the catalyst particles become inactive, the concentration of constituent carbon atoms near the catalyst particles is reduced to a relatively low value, or the temperature drops as the mixture moves beyond an area within the reactor tube 12 where the temperature range is maintained at a sufficient level for growth.

Experiment I

In one embodiment, the nature of the injector geometry, as well as the complex interaction of parameters can affect the strength and production efficiency of the nanostructures. In this experiment, yarn strength was monitored as a function of the thermal gradient at Tp2 and Tp1 (near the exit of the injector) for various concentrations of Ferrocene and Thiophene.

The results obtained for yarn strength as a function of thermal gradient are illustrated in FIG. 2. In particular, FIG. 2 shows a maximum in yarn strength as the injector thermal gradient is varied. Under lower than optimal thermal gradient conditions, there may be more time for the iron atoms generated by the decomposition of ferrocene to cluster before the clustering process is arrested by the sulfur provided by the decomposition of thiophene. This results in a larger diameter catalyst particles, which produces larger diameter and multi-walled nanotubes. The larger diameter tubes tend to be shorter, and therefore result in less-strong material. On the other hand, at larger than optimal thermal gradients there is insufficient time to cluster adequate catalyst particles in the injector (i.e., only small inadequate clusters), and the clustering process may need continue in the furnace region, where conditions are less controlled. Since there is substantially no clustering of catalyst particles in the injector, substantially no tubes are formed.

It should be noted that the strength of yarn samples is strongly dependent on the size of the yarn, expressed as the TEX value given in grams per kilometer. FIG. 3 shows a plot of yarn strength vs. TEX and illustrates that smaller TEX yarns are stronger. Correcting for different TEX samples shows that small changes in Ferrocene and Thiophene concentrations, without adjusting other parameters, do not have a significant effect on yarn strength.

On the other hand, Raman data, as illustrated in FIG. 4, show a dramatic change in the quality of the nanotubes as the Thiophene concentration is changed. Decreasing the Thiophene concentration increases significantly the RBM/G ratio. However, efficiency decreases with decreasing Thiophene. A good compromise between quality and quantity of CNT's seems to be at about 0.3% Thiophene. This also corresponds to a minimum in the D/G ratio.

With reference now to FIG. 5, a comparison of the Raman spectra for two different thiophene concentrations is illustrated. Note the similar D/G ratios but substantially different SWCNT concentrations, as evidenced by the large intensity radial breathing modes between 200 and 800 wave numbers.

Experiment II

In this experiment, carbon source additives were used. Examples of additives include $C_{60}$, $C_{70}$, $C_{72}$, $C_{84}$ and $C_{100}$. At a particular concentration, it was observed that the additives can enhance the catalyst nucleation and growth of the carbon nanotubes.

As can be seen in FIG. 6, when a carbon source additive is used, it can have a measurable effect on the RMB (radial breathing modes)/G ratio and the D/G ratio. Of interest, it does not appear that the amount of amorphous carbon is much affected. However, the presence of the carbon source additive can dramatically affect the catalyst nucleation and growth. In one embodiment, a concentration of a carbon additive at about 0.75 ppm appears to be optimal, as measured by the RBM/G ratio.

Experiment III

In this experiment, the flow of Hydrogen ($H_2$) through the injector 14 was studied to determine whether such flow can be optimized to enhance growth and production efficiency in system 10 of the present invention.

In one embodiment, as shown in FIG. 7, the ratio of Hydrogen flow through the injector to the that in the reactor tube 12, when set at about 100× to about 110× the injection rate for a given set of other parameters, with about 104× being optimal, can enhance growth and production efficiency. It should be appreciated that variations in Hr reflect variations in the ratio of Hr/Hr. Moreover, this ratio can change for different fluid mixture make up.

The optimum ratio of Hydrogen flow can also be dependent upon the internal diameter (ID) of the injector tube. As illustrated in FIG. 8, the effect of Hydrogen flow through the injector on the RBMs can differ based on different IDs. The diameter IDs tested in connection with this particular experiment varied between 7 mm and 11 mm. Of course, other diameters can be used.

Using the Raman data, these various parameters can be simultaneously optimized to reliably and reproducibly generate carbon nanotubes having a substantially large fraction of SWNTs. A Raman spectra for a substantially optimized system is shown in FIG. 9A. To the extent necessary, these optimum parameters can be modified to accommodate different furnace diameters. In FIG. 9B, an illustration of the RBM region of the spectra shown in FIG. 9A is provided. FIG. 9B essentially provides a histogram of the furnace diameter distribution.

Experiment IV

Scanning (SEM) and Transmission Electron Microscopy (TEM) was conducted on nanotubes made from an optimized furnace in system 10 of the present invention. The results from the electron microscopy are shown in FIG. 10 and FIG. 11.

In particular, FIG. 10 illustrates an SEM micrograph of optimized growth showing some spontaneous alignment of the tubes and a substantially clean microstructure. It should be appreciated that no purification was used in connection with this procedure.

Figure 11:
FIG. 11 illustrates a TEM micrograph showing very small tubes, ropes made of small tubes, larger single wall carbon nanotubes and an average amount of catalyst, and a minimal amount of amorphous carbon.

FIG. 11, on the other hand, illustrates a TEM micrograph of substantially small nanotubes, ropes made from small nanotubes, larger SWCNTs and an average amount of catalyst, and a minimal amount of amorphous carbon, all of which are consistent with the Raman spectra.

In connection with the electron microscopy, looking now at FIG. 12, a histogram of nanotube diameters measured from the TEM is provided. The histogram, as shown, is fitted to a normalize distribution. It should be noted that since this fit was a force fit, it should not be assumed that the distribution was actually a normal distribution. In fact, it appears to be skewed to the smaller diameters. This is consistent with the Raman data shown in FIG. 9A where the predominant RBMs correspond to the 0.7 nm and 1.0 nm nanotubes.

Discussion

Based on the experiments performed and the data obtained, a process for generating longer and stronger nanotubes can be provided. It is noted that smaller tubes tend to grow faster. In particular, SWNTs can rope together to form macrostructures, as was shown dramatically in the SEM micrographs above. The roped together SWNTs can transfer load from one nanotube to the next very well. As such, it is expected that small diameter SWNT material can be stronger than larger diameter SWNTs or multi-walled tubes.

Data relating a furnace used in the production of non-woven sheets of nanotubes, and into which the injector of the present invention with optimized configuration was introduced, have shown dramatic increase in textile strength, from about 40 MPa to over 300 MPa. All measurements were made without subsequent processing. In addition, it has been shown that stretching the non-woven sheets of nanotubes can increase the strength anisotropically by a factor of 3, while at the same time reducing electrical resistivity about the same amount ~$3\times10^{-4}$ ohm-cm.

Moreover, the system and process of the present invention have led to production of textile having strength exceeding 400 MPa in the as deposited state, and 1800 MPa when processed. (measured at a 1 cm gauge length)

The ability to control catalyst size through these experimental parameters opens up many possibilities for tailoring products to applications. Smaller tubes have a much higher surface area per unit mass. This means that specific capacitance should be greatly be increased. Also, smaller CNTs tend to be more reactive. This may enhance the ability to form strong composite materials. In addition, the optimization of specific diameters may allow some chirality selectivity in CNT production. In any case it may be possible to enhance the concentration of either semi-conducting or metallic tubes.

Structures formed from carbon have been discussed herein. However, it should be recognized that nanostructures, including nanotubes, can be formed from other materials, including for example, boron nitride, tungsten sulfide, vanadium oxide, and boron carbon nitride using catalytic processes similar to that described above. Accordingly, the present invention also includes extended-length nanotubes and prismatic nanostructures formed from inorganic materials such as vanadium oxide and boron nitride, and from carbon in combination with other elements, such as boron carbon nitride.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

What is claimed is:

1. A method for producing nanostructures, the method comprising:

positioning an injector at an entry end of a reactor tube used in producing nanostructures, the injector having a first heater for generating a first temperature range at a first location within a pathway of the injector and a second heater, downstream of the first heater, for generating a second temperature range at a second location within the pathway of the injector different from the first temperature range, the first and second temperature ranges both serving to condition a mixture of a catalyst precursor, a conditioning compound, and a carbon source in order to control size distribution of the nanostructures subsequently produced in the reactor tube;

nebulizing, within the pathway of an injector, the mixture into a plurality of small droplets;

decomposing, within the first temperature range generated at the first location within the pathway of the injector, the catalyst precursor in the nebulized mixture to generate catalyst particles;

decomposing, within the second temperature range generated at the second location within the pathway of the injector, the conditioning compound in the nebulized mixture;

allowing, within the pathway of the injector, the decomposed conditioning compound to interact with the catalyst particles in order to control size distribution of the catalyst particles;

directing the conditioned catalyst particles and the carbon source from within the injector into the reactor tube;

decomposing, within the reactor tube, the carbon source into its constituent atoms upon exposure of the carbon source to a third temperature range within the reactor tube different from the first temperature range and the second temperature range within the injector; and permitting the carbon atoms to interact with the conditioned catalyst particles having controlled size distribution, within the reactor tube, so that the produced nanostructures on the conditioned catalyst particles have controlled size distribution.

2. A method as set forth in claim 1, wherein the step of nebulizing includes maintaining the mixture at a temperature range so as to avoid condensation or boiling of the mixture.

3. A method as set forth in claim 1, wherein the first location within the pathway of the injector is downstream of where the step of nebulizing occurs.

4. A method as set forth in claim 1, wherein the step of decomposing the conditioning compound includes directing the nebulized mixture from the first location within the pathway of the injector to the downstream second location within the pathway of the injector at a rate sufficient to optimize decomposition of the conditioning compound for subsequent interaction with the catalyst particles.

5. A method as set forth in claim 1, wherein the step of decomposing the conditioning compound includes conditioning the catalyst particles at a location within the pathway of the injector down stream of the location where the step of decomposing the catalyst precursor occurs.

6. A method as set forth in claim 1, wherein the step of directing includes maintaining a laminar flow as the conditioned catalyst particles and the carbon source move from within the injector into the reactor tube.

7. A method as set forth in claim 1, further including maintaining a temperature gradient between the steps of decomposing the catalyst precursor, decomposing the conditioning compound, and decomposing the carbon source.

* * * * *